United States Patent
Patterson, Jr. et al.

(10) Patent No.: US 6,309,768 B1
(45) Date of Patent: Oct. 30, 2001

(54) PROCESS FOR REGENERATING A CARBON MONOXIDE OXIDATION REACTOR

(75) Inventors: Timothy W. Patterson, Jr., East Hartford; Roger R. Lesieur, Enfield, both of CT (US)

(73) Assignee: International Fuel Cells LLC, S. Windsor, CT (US)

( * ) Notice: Subject to any disclaimer, the term of this patent is extended or adjusted under 35 U.S.C. 154(b) by 0 days.

(21) Appl. No.: 09/346,888

(22) Filed: Jul. 2, 1999

(51) Int. Cl.$^7$ ........................................ H01M 8/00
(52) U.S. Cl. .................... 429/13; 429/17; 423/437.1; 423/437.2
(58) Field of Search ............. 429/13, 17; 423/437.1, 423/437.2

(56) References Cited

U.S. PATENT DOCUMENTS

| | | | |
|---|---|---|---|
| 3,897,511 | * 7/1975 | Frevel et al. | 502/318 |
| 4,059,677 | * 11/1977 | Sare et al. | 423/240 S |
| 4,074,973 | 2/1978 | Igaki et al. | 23/230 PC |
| 4,200,682 | * 4/1980 | Sederquist | 429/17 |
| 4,810,595 | * 3/1989 | Kahara et al. | 429/16 |
| 4,910,099 | 3/1990 | Gottesfeld | 429/13 |
| 5,330,727 | 7/1994 | Trocciola et al. | 422/177 |
| 5,750,076 | 5/1998 | Buswell et al. | 422/115 |
| 5,843,195 | * 12/1998 | Aoyama | 429/17 |
| 5,853,674 | 12/1998 | Lesieur | 422/173 |

* cited by examiner

Primary Examiner—Mark F. Huff
Assistant Examiner—Daborah Chacko-Davis
(74) Attorney, Agent, or Firm—Barlow, Josephs & Holmes (57) ABSTRACT

A process for regenerating a selective oxidizer bed, by the introduction of oxygen is provided. In a single oxidizer bed environment, regeneration may be carried out on shut-down or on start-up. On start-up, the process includes providing a selective oxidizer bed as well a fuel processor. The selective oxidizer bed is heated to approximately 180° F. Air is passed through the selective oxidizer bed while maintaining the selective oxidizer bed at a temperature of approximately 180° F. for 1–2 minutes. The selective oxidizer is then purged with steam to remove residual air therefrom. Fuel is then introduced from the fuel processor into the selective oxidizer. On shut-down, residual fuel is purged from the oxidizer bed and then air is passed therethrough while maintaining the bed at a temperature between approximately 180° F. to approximately 220° F. The oxidizer is allowed to cool to ambient temperature and then heated to 180° F. Residual air is then purged from the oxidizer for subsequent introduction of fuel. Multiple oxidizer beds may be provided in parallel to one another to enable continuous, uninterrupted operation with bed remaining operation at all times while the other is being regenerated. Regeneration may also be carried out by thermal cycling of the selective oxidizer bed.

8 Claims, 3 Drawing Sheets

PROCESS FOR REGENERATING A CARBON MONOXIDE OXIDATION REACTOR

This is a related application to commonly owned applications Ser. No. 09/265,139 pending, filed Mar. 8, 1999 and Ser. No. 09/273,735 allowed, filed Mar. 22, 1999.

TECHNICAL FIELD

The present invention relates to a method and apparatus for selectively oxidizing the carbon monoxide present in a mixture of gases, including hydrogen, carbon dioxide and water vapor. In particular, the present invention relates to a method for counteracting the poisoning effects of the selective oxidation catalyst active sites by carbon monoxide; to maintain the concentration of carbon monoxide in the outlet gas stream well below 10 parts per million ("ppm") and to periodically regenerate the selective oxidizer bed.

BACKGROUND ART

Electrochemical fuel cells convert fuel and oxidant to electricity and reaction product. In electrochemical fuel cells employing hydrogen as the fuel and oxygen as the oxidant, the reaction product is water. Recently, efforts have been devoted to identifying ways to operate electrochemical fuel cells using other than pure hydrogen as the fuel. Fuel cell systems operating on pure hydrogen are generally disadvantageous because of the expense of producing and storing pure hydrogen gas. In addition, the use of liquid fuels is preferable to pure, stored hydrogen in some mobile and vehicular applications of electrochemical fuel cells.

Recent efforts have focused on the use of hydrogen obtained from the chemical conversion of hydrocarbon and oxygenated fuels into hydrogen rich gas. However, to be useful for fuel cells and other similar hydrogen-based chemical applications, these fuels must be efficiently converted to relatively pure hydrogen with a minimal amount of undesirable chemical by-products, such as carbon monoxide (CO). The presence of such CO by-product greatly decreases the performance of the fuel cell and has a particularly detrimental effect on the anode of the fuel cell.

Conversion of hydrocarbons and oxygenated fuels such as methanol to hydrogen is generally accomplished through steam reformation in a reactor commonly referred to as a catalytic reformer. The steam reformation of methanol is represented by the following chemical equation:

$$CH_3OH + H_2O + heat \rightarrow 3H_2 + CO_2 \qquad (1)$$

Due to competing reactions and thermodynamic limitations, the initial gaseous mixture produced by steam reformation of methanol typically contains from about 0.5% to about 20% by volume of carbon monoxide and about 65% to about 75% hydrogen, along with about 10% to about 25% carbon dioxide on a dry basis (in addition, water vapor can be present in the gas stream). The initial gas mixture produced by the steam reformer can be further processed by a shift reactor (sometimes called a shift converter) to increase the hydrogen content and to reduce the carbon monoxide content to about 0.2% to about 2%. The catalyzed reaction occurring in the shift converter is represented by the following chemical equation:

$$CO + H_2O \rightarrow CO_2 + H_2 \qquad (2)$$

Even after a combination of steam reformer/shift converter processing, the product gas mixture will have minor amounts of carbon monoxide and various hydrocarbon species, each present at about 1% or less of the total product mixture. A variety of conventional treatment processes may be employed to remove many of the hydrocarbon impurities generated during the steam reformer/shift converter process. However, such conventional treatment methods are generally incapable of reducing the carbon monoxide content of the gases much below 0.2%. Although this fuel processing was described for methanol as the fuel is well known that other gaseous or liquid fuels, such as methane or gasoline, may be reformed to a hydrogen rich gas. Likewise alternatives to steam reforming, such as autothermal reforming, are also well known.

In low temperature, hydrogen-based fuel cell applications, which typically have an operating temperature of less than 100° C., the presence of carbon monoxide in the inlet hydrogen stream, even at the 0.1% to 1% level, is generally unacceptable. In solid polymer electrolyte fuel cells, the electrochemical reaction is typically catalyzed by an active catalytic material comprising a noble metal, or noble metal alloys, such as platinum or platinum-ruthenium. In addition, other metals may be employed as a catalyst material, such as palladium or rhodium. Further, the noble metal may be promoted with metal oxides, such as iron oxide, cerium oxide, manganese dioxide, tungsten oxide, and the like.

However, carbon monoxide adsorbs preferentially to the surface of platinum, effectively poisoning the catalyst and significantly reducing the rate and efficiency of the desired electrochemical reaction. Thus, the amount of carbon monoxide in the hydrogen-containing gas mixture produced by a steam reformer/shift converter process for use in electrochemical fuel cells should be minimized, preferably to an amount significantly lower than the approximately 1% achieved using conventional steam reformation and shift conversion methods. The present selective oxidizing method and apparatus reduce the amount of carbon monoxide in a hydrogen-containing gas stream to a level suitable for use in low temperature electrochemical fuel cells, generally significantly less than 100 ppm.

In known selective oxidizing methods, it is believed that at least three competing reactions occur, which are represented by the following chemical equations:

1. The desired oxidation of carbon monoxide to carbon dioxide:

$$CO + \tfrac{1}{2}O_2 \rightarrow CO_2 \qquad (3)$$

2. The undesired oxidation of hydrogen to water:

$$H_2 + \tfrac{1}{2}O_2 \rightarrow H_2O \qquad (4)$$

3. The undesired reverse water gas shift reaction:

$$CO_2 + H_2 \rightarrow H_2O + CO \qquad (5)$$

One of the most common selective oxidizer designs uses an adiabatic catalyst bed to react the carbon monoxide with oxygen supplied by an oxygen-containing gas (e.g., air). Catalyst loading, bed space velocity, and air flow are selected to control the temperatures in the bed so that bed size is minimized while the selectivity of the reaction to consume carbon monoxide is maximized.

Performance of the selective oxidizer catalyst gradually decays due to the gradual poisoning of the catalyst active sites with carbon monoxide. After a period of time, this decrease in catalyst performance caused by carbon monoxide results in a rapid increase in the carbon monoxide concentration of the selective oxidizer exit gas stream which is fed as the inlet stream to the fuel cell assembly. In conventional selective oxidation methods, poisoning of the selective oxidizer catalyst by carbon monoxide can be compensated for by increasing the catalyst bed temperature. However, while an increase in the bed temperature helps to compensate for the loss of catalyst activity, it also results in the loss of reaction selectivity, and thus increased hydrogen consumption which is highly undesirable in fuel cell applications.

In view of the foregoing, it is understood in the art that regeneration of the selective oxidizer is required to reverse the gradual deterioration of catalyst performance due to the poisoning of the catalyst active sites. However, after the catalyst has been regenerated, the undesired process of poisoning of the catalyst will resume again. Thus, the need for periodic regeneration of the catalyst is required.

Prior art attempts have been made to address the concerns of poisoning of the catalyst as well as the need for periodic regeneration of the catalyst. There are particular problems associated with regeneration of the catalyst in that while the catalyst is being regenerated, the selective oxidizer cannot be used thus rendering it and, as a result, the fuel cell inoperative for a period of time. To address these problems, prior art systems have been developed where at least two selective oxidizers are arranged in series with one another and operating at two distinct temperatures. Alternatively, two selective oxidizer beds may be operated in parallel; with one being regenerated while the other operational. In that type of system, the first selective oxidizer operates at a temperature greater than the second to remove most of the carbon monoxide while maintaining a high enough temperature to eliminate poisoning effects.

However, the foregoing prior art systems are not well suited for automobile applications where size and weight are of paramount concern. As a result, the prior art systems with multiple selective oxidizer beds in series or in parallel suffer from the disadvantages of increased weight, volume, complexity and the associated cost. In addition, these systems operate at high temperatures thus requiring a separate heat exchanger to cool the stream prior to entering the fuel cell. Due to their high temperature and series arrangement, hydrogen fuel loss in the reaction is high resulting in poor over-all fuel cell efficiency.

In view of the foregoing, an improved catalyst and selective oxidizer bed regeneration process is desired that employ systems that are much lighter in weight than prior art systems and less complex in design and less expensive to manufacture, operate and maintain. Further, there is a desire for a process for regeneration of a selective oxidizer that employs only a single selective oxidizer bed in series with the fuel cell. There is also a desire for such a process to permit the selective oxidizer to operate at a relatively low temperature to obviate the need for a separate heat exchanger to cool the oxidized gas prior to the fuel entering the cell. It is also desirable that a suitable process for catalyst regeneration in a automobile environment be provided that is less expensive, more efficient and less expensive to manufacture and operate.

DISCLOSURE OF THE INVENTION

The present invention preserves the advantages of prior art processes for regenerating selective oxidizer beds of fuels as well as reducing the overall carbon monoxide level in a gaseous stream. In addition, it provides new advantages not found in currently available processes, and overcomes many disadvantages of such currently known processes.

A process for regenerating a selective oxidizer bed, by the introduction of an oxygen containing gas, is provided. In a single oxidizer bed environment, which is well suited for vehicle applications, regeneration may be carried out on shut-down or on start-up of the fuel cell power plant. On start-up, the process includes providing a selective oxidizer bed as well a fuel processor system. The single selective oxidizer bed is heated to approximately 180° F. Air, or an oxygen containing gas, is passed through said selective oxidizer bed while maintaining the selective oxidizer bed at a temperature of approximately 180° F. for 1–2 minutes. The selective oxidizer is then purged with steam or an inert gas, such as nitrogen, to remove residual air therefrom. Fuel is then introduced from the fuel processor system into the selective oxidizer to begin operation of the fuel cell power plant. On shut-down of the fuel cell power plant, residual fuel is purged from the oxidizer bed with steam or an inert gas, such as nitrogen, and then air, or an oxygen containing gas, is passed therethrough while maintaining the bed at a temperature between approximately 180° F. to approximately 220° F. The oxidizer is allowed to cool and is stored at ambient temperature until the power plant is restarted. On restart of the fuel cell power plant, residual air, or oxygen containing gas, is then purged from the oxidizer with steam or nitrogen for subsequent introduction of fuel. Multiple oxidizer beds, which are appropriate for stationery fuel cell applications, may be provided in parallel to one another to enable continuous, uninterrupted operation with one bed remaining in operation at all times while the other is being regenerated. Regeneration may also be carried out by thermal cycling of the selective oxidizer bed.

In accordance with the present invention, the process includes the embedding cooling coils within said selective oxidizer bed and introducing coolant through the cooling coils to effectively control the temperature of the selective oxidizer bed. The temperature of a selective oxidizer bed is controlled by altering the temperature and/or flow rate of the coolant through the cooling coils during normal operation and regeneration.

Accordingly, it is a general object of the present invention to avoid the disadvantages of the prior art.

More particularly, it is an object of the present invention to provide a method of selectively removing carbon monoxide from a gaseous medium by oxidation, which method does not possess the disadvantages of the known methods of this kind.

Another object of the present invention is to provide a process for regenerating a selective oxidizer bed used to reduce the carbon monoxide concentration in a fuel.

Still another object of the present invention is to provide a process for regenerating a selective oxidizer bed at start-up or shut-down of a fuel cell power plant.

It is yet another object of the present invention to provide a process that enables continuous operation a fuel cell power plant while achieving periodic regeneration of the selective oxidizer bed.

A concomitant object of the present invention is to design the apparatus of the above type in such a manner as to be relatively simple in construction, inexpensive to manufacture, easy to use, and yet reliable in operation.

Another object of the present invention is to provide a process for periodically reversing the effects of carbon monoxide poisoning in the catalyst bed for improved fuel cell performance.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

MODES FOR CARRYING OUT THE INVENTION

Figure 1:
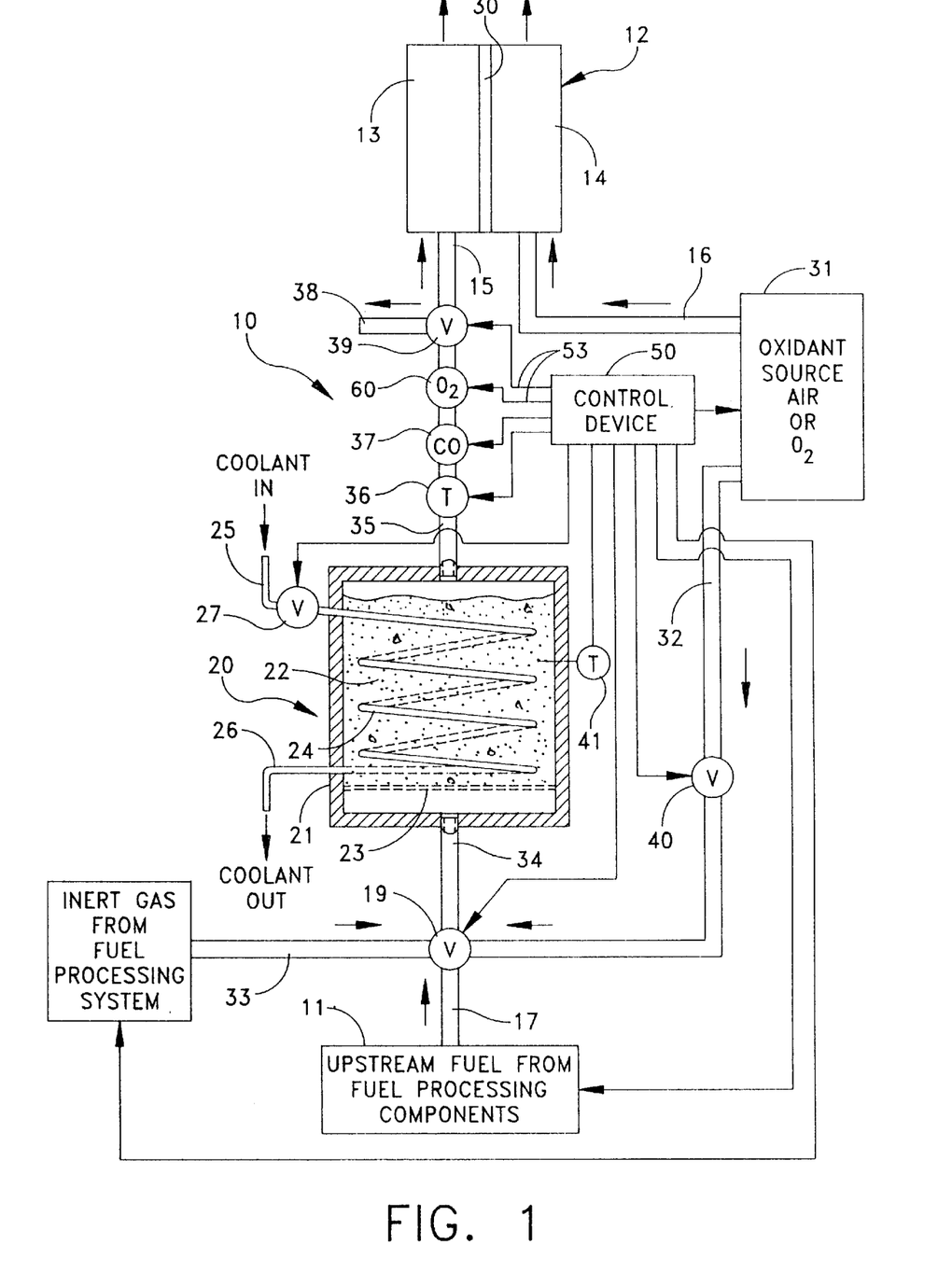
FIG. 1 is a simplified elevational view, partly in cross-section and partly in block diagram form, of the preferred embodiment of a selective oxidizer apparatus employed by the preferred process of the present invention as used for treating hydrogen rich fuel for a fuel cell device.

Referring now to the drawings in detail, and first to FIG. 1 thereof, it may be seen that the reference numeral 10 has been used therein to identify a selective carbon monoxide removal apparatus constructed in accordance with the present invention. As illustrated, the apparatus 10 is to be used for reducing to a minimum level the concentration of carbon monoxide in a hydrogen rich fuel stream fed from upstream fuel processing components, typically an autothermal reformer and shift converter in series 11 to a fuel cell device 12. While the fuel cell device 12 has been illustrated, for the sake of simplicity, as being constituted by a single fuel cell having an anode side 13, cathode side 14, and electrolyte 30 therebetween, it is to be understood that the fuel cell device 12 can and, as is well known, usually does, contain a multitude of such individual fuel cells arranged in groups, stacks and similar assemblies. The electrolyte may be an aqueous acid or, preferably, a proton exchange membrane (PEM). Fuel cells that use a PEM typically operate at temperatures that are less than 100° C. Even in this instance, however, the fuel cell device 12 has the anode side 13 to which the treated gaseous fuel is fed through a fuel supply conduit 15, and the cathode side 14 to which a gaseous oxidant, such as oxygen or air, is admitted or supplied through an oxidant supply conduit 16.

The general principles of construction and operation of the fuel cell device 12 are so well known as not to require detailed explanation herein. Suffice it to say that a catalytic electrochemical reaction takes place in the fuel cell device 12, resulting in combination of hydrogen with oxygen into product water, and in generation of a useful output, that is, electric power.

The fuel cell device 12 electrochemical reaction requires the presence of at least one catalyst, typically a carbon-supported platinum or platinum alloy. Catalysts of this kind are known to have a pronounced affinity for carbon monoxide, with the deleterious effect that any carbon monoxide carried to the anode side 13 of the fuel cell device in the hydrogen rich fuel stream admitted through the fuel supply conduit 15 will "poison" the anode catalyst or a portion thereof, that is, render it less effective for promoting the desired electrochemical reaction by attaching itself to the catalyst and thus denying the hydrogen access thereto. The extent of such anode catalyst poisoning is determined in part by the concentration (or partial pressure) of carbon monoxide present in the gaseous fuel and the operating temperature of the fuel cell.

Obviously, this problem does not exist when pure, or substantially pure, hydrogen is being used as the fuel. However, such pure hydrogen is rather expensive and difficult to handle and deliver, so that a search is on in the fuel cell field for ways to utilize alternative fuels, such as methane, natural gas, or other hydrocarbon fuels, such as gasoline. Yet, such alternative fuels cannot be efficiently used in the fuel cell devices as such; rather, they or their components have to be converted into simpler components, especially hydrogen to be used as the fuel in the fuel cell. Such conversion usually takes place, in accordance with well known principles, in a steam reformer and a shift converter together constituting the fuel processing system 11. Unfortunately, experience has shown that it is not possible to achieve complete conversion of the carbon monoxide contained in the incoming fuel to carbon dioxide, which means that the gaseous fuel leaving the fuel processing system 11 through a discharge conduit 17 contains a relatively high percentage, such as 1%, or 10,000 parts per million (ppm), of carbon monoxide.

As mentioned before, the catalyst present at the anode side 13 of the fuel cell device 12 cannot tolerate carbon monoxide without suffering performance loss or effectiveness or other damage. Obviously, the extent of deterioration would be extremely high if the hydrogen rich gas exiting the fuel processing system 11 were supplied directly to the anode side 13. Therefore, it is crucial to provide for removal of as much of the carbon monoxide from such hydrogen rich gas as possible to assure that the fuel cell device 12 will remain operational over a reasonable amount of time. Ideally, the hydrogen rich gas would be rid of all carbon monoxide before being supplied to the anode side 13 of the fuel cell device 12, but that is impossible to achieve, at least with the current state of technology. This being so, it is important to reduce the carbon monoxide concentration in the gaseous fuel supplied to the anode side 13 to a minimum.

As shown in FIG. 1, a selective oxidation device 10 is employed to reduce the carbon monoxide concentration in the hydrogen rich gas that is supplied to the fuel cell 12. The selective oxidation device 10 includes a selective oxidizer stage 20 that is supplied with the hydrogen rich gas emerging from the fuel processing system 11 through the discharge conduit 17. Selective oxidizer stage 20 includes an enclosed vessel or container 21 which bounds an internal chamber. A respective body or bed 22 of a catalyst capable of selectively oxidizing carbon monoxide in the presence of gaseous oxygen is contained in the internal chamber of the container 21, being shown to be supported on a perforated or otherwise gas-permeable support member 23 which facilitates the distribution of the gaseous fuel to all regions of the catalyst bed 22 and makes it as uniform as possible. The catalyst contained in the bed 22 is of the type known to be highly selective for carbon monoxide. Currently, it is preferred to use alumina supported platinum, by itself or in combination with other trace elements, for the selective catalyst of the catalyst bed 22.

Gaseous oxygen, the presence of which is needed for the performance of the selective oxidizing reaction in the catalyst bed 22, is supplied from oxygen or oxygen-carrying gas source 31 via conduit 32 to four way valve-mixing device 19 for mixing with the gaseous fuel flowing in the conduit 17. Trim valve 40 is also preferably provided to precisely control the flow of oxidant via conduit 32. However, it is to be understood that such oxygen or oxygen-carrying gas could be introduced instead directly into the container 21 either only upstream of the catalyst bed 22 or additionally into the bed 22 itself.

In addition, steam from the fuel processing system is provided via conduit 33 into valve 19 for mixing with the gaseous fuel and oxygen from oxidant source 31. As a result, the inlet gas fed to the selective oxidizer 20, via conduit 34, may be selectively a combination of one or more of the component sources via conduits 32, 17 and 33. Alternatively, the stream source, form the fuel processing system 11, may be replaced by an inert gas source. An example of an inert gas source is nitrogen stored as a compressed gas or produced by means of a catalytic combustion process. As will be described in detail below, these components are selectively used at different times to carry out the process of the present invention.

At outlet gas conduit 35, temperature sensor 36 is provided in-line with the outlet gas flow from oxidizer 20 for monitoring the temperature of gas flowing through conduit 35. In addition, a carbon monoxide sensor 36 may also be provided in-line with outlet gas conduit 35 to monitor the carbon monoxide concentration in the gas flowing therethrough. Further, an oxygen sensor 60 may also be provided in-line with outlet gas conduit 35 to monitor the levels of oxygen present at the output of bed 20. The levels of oxygen in gas conduit 35 is indicative of the effectiveness of bed 20. As bed 20 becomes more and more poisoned over time, more oxygen will be present in conduit 35 because less oxygen-consuming reactions are taking place.

Still referring to FIG. 1, a optional exhaust outlet conduit 38 is provided from outlet gas conduit 35. This flow of the optional exhaust outlet conduit is controlled by valve 39. After sensors 36 and 37 and valve 39, fuel supply conduit provide the processed fuel to the anode side 13 of fuel cell 12.

A cooling coil 24 is shown to be embedded in the catalyst bed 22, being supplied with a coolant through a coolant supply conduit 25, with the coolant being discharged from the cooling coil 24 after passing therethrough via a respective spent coolant discharge conduit 26. The rate of flow of the fresh coolant into the respective cooling coil 24 is controlled by a respective coolant flow control valve 27. The coolant stream is typically of a temperature in the range of 160° F. to about 360° F.

The operation of the selective oxidizing apparatus 10 and particularly of the valve 27 is controlled by a control device 50 which may be of any known construction and usually includes a computer or a part of a computer, such as a microprocessor, that controls the operation of the fuel cell 12 and/or the fuel processing system 11, and appropriate software. The control device 50 is intended to control the apparatus 10 in such a manner that the selective oxidizing process, which is exothermic by nature, takes place in the catalyst bed 22 under well defined temperature conditions and sequence of processing that will be explained later. To be able to do this, the control device 50 is furnished with information from temperature sensor 36, carbon monoxide sensor 37, oxygen sensor 60 through connecting lines 53, concerning the temperatures of the gaseous fuel after it has left the oxidizer 20, of the selective oxidizing apparatus 10. Based on this information, the control device 50 then issues control commands that are furnished to the respective valves 40, 19, 27 and 39 through control lines 53 to thereby control the rate of flow of the coolant, oxidant, fuel and inert gas via their respective valves and conduits.

Control algorithms capable of accomplishing this purpose are of the well known type so that they need not be described in detail here. In accordance with the present invention, the cooling of, that is the removal of the exothermic oxidizing reaction heat from, the catalyst bed 22 is controlled via the valve 27 in such a manner that the temperatures existing in the catalyst bed 22 may be precisely controlled by the temperature and flow rate of coolant through coils 24. As is understood, the greater the flow rate of coolant or the lower the coolant inlet temperature, the lower the temperature of the catalyst bed will be. Similarly, the lower the flow rate of coolant or the higher the coolant inlet temperature, the higher the temperature of the bed will be. As a result, the temperature of the bed 22 may be easily controlled by the coolant flow rate and temperature.

The above apparatus, as shown in FIG. 1, is employed to feed an oxidant, such as oxygen or air, into a hydrogen rich fuel stream to, thereby, reduce the overall carbon monoxide concentration therein. The supply to fuel cell 12 of fuel with a low concentration of carbon monoxide is of critical importance to the performance of the fuel cell 12. However, over time, the catalyst bed of the selective oxidizer 20 becomes poisoned itself during the process of reducing the level of carbon monoxide in the fuel gas supplied to the anode 13 of fuel cell 12. As a result, the selective oxidizer 20, with a poisoned catalyst bed 22, will be less effective in reducing the level of carbon monoxide.

Figure 2:
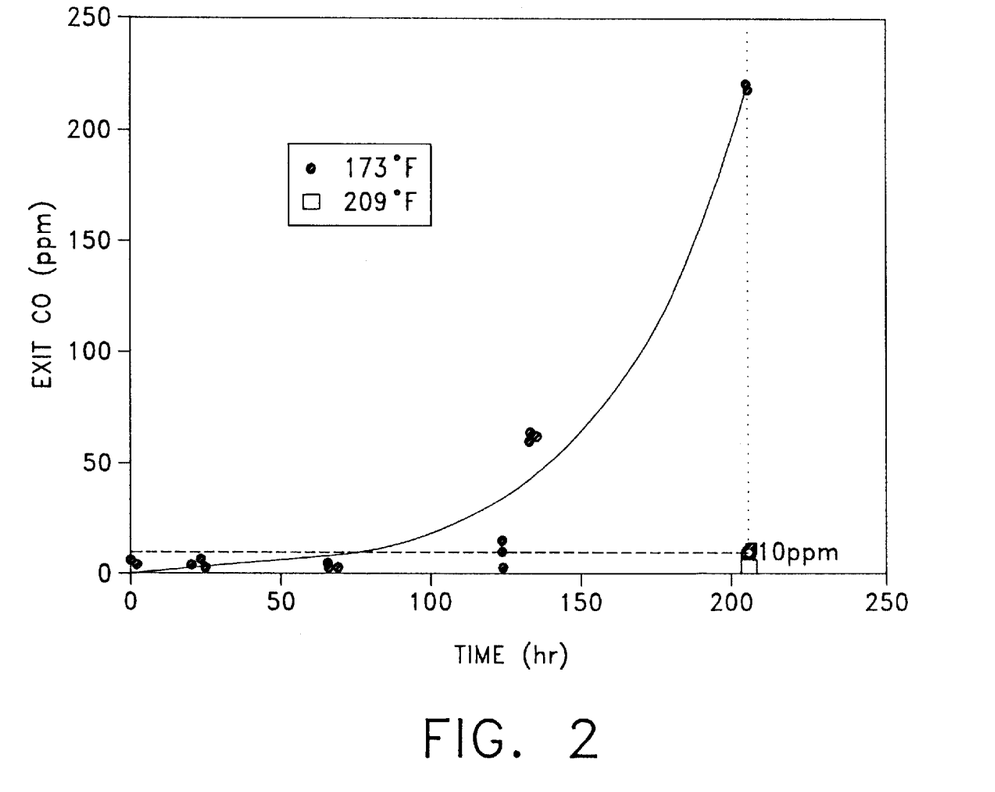
FIG. 2 is a graph of test data showing the concentration carbon monoxide over time and at a given temperature at the exit of the selective oxidizer.

Therefore, the catalyst bed 22 of selective oxidizer 20 must be periodically regenerated to purge the carbon monoxide so it may resume effective reduction of the carbon monoxide concentration in the hydrogen rich fuel supplied to the fuel cell 12. As shown in FIG. 2, the importance of regeneration of the selective oxidizer 20 is of critical importance to maintain a low level of carbon monoxide from the selective oxidizer 20. Referring specifically to the graph of FIG. 2, an acceptable exit carbon monoxide concentration (present at conduit 35 in FIG. 1) for supply to the fuel cell 12 is 10 ppm as represented by the horizontal dotted line. Over time, the catalyst bed 22 of selective oxidizer 20 becomes increasingly poisoned. As shown, the carbon monoxide concentration begins to exceed the minimum preferred threshold at approximately 100 hours of operation. Further, after 200 hours of operation, the carbon monoxide content exceeds 200 ppm which renders the selective oxidizer virtually incapable of further reducing the carbon monoxide content through exit conduit 35 to supply suitable hydrogen rich gas to fuel cell 12.

FIG. 2 further illustrates the effect of temperature of the catalyst bed on the concentration of carbon monoxide in the exit stream from the selective oxidizer 20. As shown in FIG. 2, the concentration of carbon monoxide in the exit stream is returned to below the maximum acceptable level of 10 ppm when the temperature of the catalyst bed 22 is cycled to a temperature of 209° F. and then returned to 173° F. In contrast, when the catalyst bed remained at a temperature of 173° F., the concentration of carbon monoxide at the exit stream undesirably increased exponentially over time.

In the results shown in FIG. 2, a total pressure of 35 PSIG at a dew point of 140° F. was employed with an a carbon monoxide inlet concentration at 0.9%. Also exhibited was a space velocity equal to: [3,000 $Ft^3$ hydrogen rich gas/hour]/ $Ft^3$ Catalyst Bed. A dry gas inlet concentration of 0.9% CO, 1.35% $O_2$, 28% $CO_2$ and 69.75% $H_2$ was employed. In 24 minutes of regeneration, the CO concentration went from 217 ppm to 8 ppm. A much shorter regeneration time is expected if the catalyst had not been allowed to decay to such a high CO level.

In accordance with the present invention, a process is provided that reduces the exit carbon monoxide concentration by manipulating the temperature of the catalyst bed 22 along with a unique process for oxidizing the catalyst bed to effectively regenerate the selective oxidizer 20 for continued use.

FIG. 1 illustrate a selective oxidizer arrangement which is used to carry out the process of the present invention. FIG. 1 illustrates a preferred embodiment of the present invention where a single selective oxidizer 20, with a single catalyst bed 22, is provided. The preferred process provides for operating the single catalyst bed 22 at a relatively low temperature of 180° F. This single low temperature catalyst bed 22 is advantageous over the prior art multiple bed systems in that it has reduced weight, volume, complexity, cost, better efficiency. Since the single bed 22 operates at a low temperature, there is no need for a heat exchanger, as required in the prior art, to cool the fuel stream prior to entry into the PEM fuel cell. In view of the foregoing advantages, a process employing a single catalyst bed is ideally suited for automobile applications where weight, volume, complexity, cost and efficiency are of particular concern.

In accordance with the process of the present invention, regeneration of the catalyst bed is carried out on either start-up of the entire power plant including fuel cell 12 or on shut-down of the entire power plant including fuel cell 12. Turning first to employment of the process of the present invention at an automobile shut-down, a process for regeneration of the catalyst bed 22 is shown. This shut-down regeneration is executed when the automobile has ceased operation for a time period, such as when the automobile is not in use. Specifically, the regeneration process at shut-down includes the steps of first stopping the fuel flow from the upstream fuel processing components 11 by four-way valve 19 as controlled by control device 50. Oxygen flow through conduit 32 is also shut off. Next, the selective oxidizer 20 and anode 13 of the fuel cell are purged with steam or an inert gas via conduit 33 and through valve 19 to remove any residual fuel. Air, or an inert gas, is then passed through the selective oxidizer 20 from oxidant source 31 via conduit 32 and valve 19 to inlet conduit 34. This step of passing air through the selective oxidizer 20 is executed while maintaining the temperature of catalyst bed 22 at a temperature of approximately 180° F. for a period of 1–2 minutes. As stated above the temperature of bed 22 is precisely controlled by the rate of flow and temperature of coolant through coils 24 embedded with catalyst bed 22. Sensor 41 is provided within catalyst bed 22 to monitor the temperature therein to provide corresponding data to the control device 50 to, in turn, control the flow of coolant through coils 24 to adjust the temperature of the catalyst bed 22. This step of passing air through the selective oxidizer 20 effectively removes the carbon monoxide therein by oxidizing the remaining carbon monoxide adsorbed on the catalyst to carbon dioxide as illustrated in formula (3) above.

Next, the selective oxidizer 20 is allowed to cool to ambient temperature. Upon re-start of the entire power plant including fuel cell 12, the selective oxidizer 20 is heated to approximately 180° F. The selective oxidizer 20 and fuel cell 12 are purged with steam or an inert gas from the fuel processing system via conduit 33 and valve 19, in the appropriate position, to remove residual air from the system. Fuel from the upstream fuel processing components 11 is supplied via conduit 17 and valve 19 to inlet conduit 34 to supply gaseous fuel to the selective oxidizer for processing; and oxygen flow through conduit 32 and valve 19 is also supplied to conduit 34.

As can be understood, in accordance with the present invention, the regeneration process of the selective oxidizer 20 may be executed upon start-up of the automobile. In this variation of the present invention, the selective oxidizer is heated to approximately 180° F. Air is subsequently passed through the selective oxidizer while maintaining the temperature thereof at a temperature of approximately 180° F. for a period of 1–2 minutes. Next, the selective oxidizer 20 and fuel cell 12 is purged with steam or an inert gas from the fuel processing system 11 to remove residual air. Finally, fuel from the fuel processing components 11 is introduced into the inlet conduit to the selective oxidizer 20 for normal operation of the fuel cell. As in the preferred regeneration process at shut-down, the control of temperature and flow of fuel, oxidant, steam and coolant are controlled by control device 50 with the assistance of various sensors and valves discussed above.

During normal operation of the fuel cell power plant, fuel from the upstream fuel processing components, which contains $H_2/CO_2/H_2O$ and less than 2% carbon monoxide is preferably mixed at valve 19 with and oxidant from oxidant source 31 via conduit 32 in a ratio of $O_2$ to CO which is 1–4×the stoichiometry of equation (3), then passed into the selective oxidizer 20 where carbon monoxide reacts with $O_2$ reducing the carbon monoxide level to less than 10 ppm. A coolant, which can be water or any known heat transfer or antifreeze solution, is passed through coils 24 in the selective oxidizer 20 to remove the heat created by the exothermic reaction of the oxidation of the carbon monoxide to maintain the temperature of the catalyst bed at approximately 180° F. Since the selective oxidizer operates at the relatively low temperature of 180° F., there is no need for a separate heat exchanger between the exit conduit 35 of the selective oxidizer 20 and the input conduit 15 of PEM fuel cell 12.

In an alternate process of the present invention which employs the single catalyst bed of FIG. 1, regeneration of the selective oxidizer is achieved by thermal cycling. In particular, the catalyst bed 22 is raised from the normal operating temperature of approximately 180° F. to approximately 220° F. for 1–2 minutes. The temperature of the catalyst bed is raised by reducing the flow of coolant or by increasing the temperature of the coolant through coils 24 in an appropriate amount such that the temperature remains raised during the desired period discussed above. The step of raising the temperature of the catalyst bed 22 may be executed when the exit carbon monoxide reaches a certain predetermined level; when the exit exhaust temperature or oxygen level at conduit 35 reaches a certain level; or after predetermined period time.

The elevation of the temperature of the catalyst bed 22 to approximately 220° F. from 180° F. serves to regenerate the catalyst bed because the elevation in the temperature in excess of 200° F. compensates for the loss of catalyst activity and results in the loss of reaction selectivity. Increasing the temperature of the selective oxidizer beds 120a and 120b from approximately 180° F. to approximately 210° F. increases the rate of oxidation of the carbon monoxide adsorbed on the catalyst bed thus refurbishing the catalyst. Fuel and air flow are not interrupted during the regeneration cycle.

Figure 3:
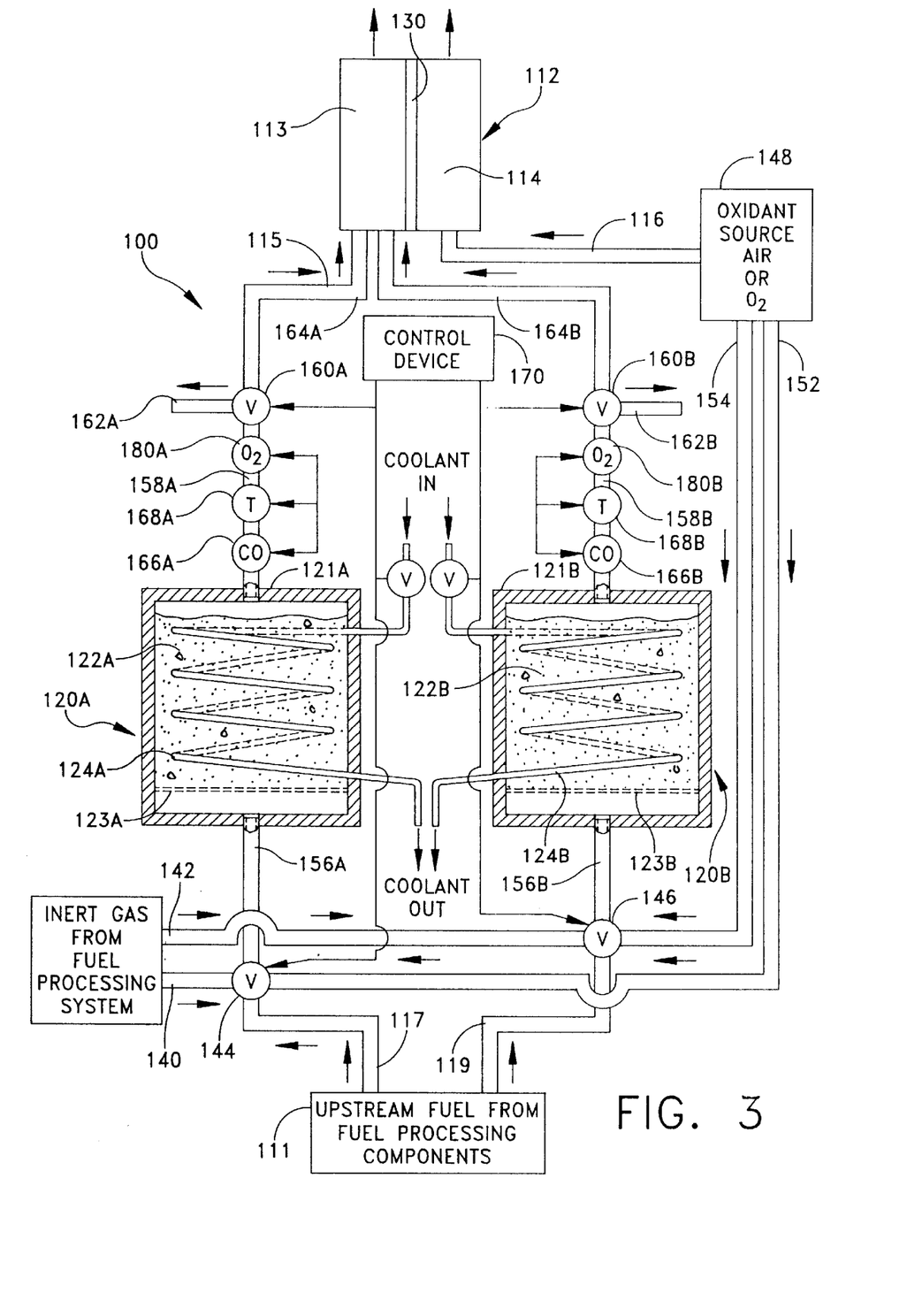
FIG. 3 is a simplified elevational view, partly in cross-section and partly in block diagram form, of a selective oxidizer apparatus employed by an alternative embodiment of the process of the present invention as used for treating gaseous fuel for a fuel cell device.

In addition to the preferred embodiment of the process of the present invention, an alternative process of the present invention is also provided which is carried out by the system shown in FIG. 3. The apparatus 100 of FIG. 3 is similar to the apparatus 10 of FIG. 1; however, two separate selective oxidizers 120A and 120B are provided in parallel as opposed to the single selective oxidizer 20 of FIG. 1. The apparatus of FIG. 3 enables the process of the present invention to be carried out for continuous operation of a fuel cell power plant. In general, when one bed 120A or 120B is operating the other bed is being regenerated to provide for a process of continuous operation and regeneration without interruption.

In particular, FIG. 3 provides a first selective oxidizer 120A and a second selective oxidizer 120B each of which receive fuel from the fuel processing components 111 via respective conduits 117 and 119. In addition, steam or an inert gas is also provided to each selective oxidizer 120 and 13 respectively, via conduits 140 and 142 and four-way valves 144 and 146. Further, an oxidant source 148 provides air or oxygen to the valves 144 and 146, respectively, via conduits 152 and 154. As a result, inlet conduits 156A and 156B are connected to selective oxidizers 120A and 120B.

Within the selective oxidizers, as in the selective oxidizer 20 of FIG. 1, is are catalyst beds 122A and 122B, respectively housed within housing containers 121A and 121B. Gas permeably support members 123A and 123B are provided for the purposes discussed above. Coils 124A and 124B are also provided for routing coolant through the catalyst beds 122A and 122B to control the temperature thereof. As indicated, coolant is introduced into coils 124A and 124B at an open opposing end thereof. Exit conduits 158A and 158B are also provided into valves 160A and 160B for optional respective exhaust from conduits 162A and 162B. In addition, fuel cell entry conduits 164A and 164B are respectively provided for each selective oxidizer 120A and 120B to provide fuel gas exhaust to the anode 113 of fuel cell 112. Still further, the oxidant source also provides oxygen or air to the cathode 114 on the opposing side of electrolyte 130 of fuel cell 112.

In line with the output conduits 158A and 158B, respectively, are provided temperature sensors 166A and 166B, oxygen sensors 180a and 180b, as well as carbon monoxide sensors 168A and 168B. Control device 170 is provided and interconnected to each of the valves and sensors within the system to monitor the respective levels thereof.

Each of the selective oxidizers 120A and 120B operate in identical fashion to the selective oxidizer employed in the preferred process of the present invention. However, the parallel configuration enables a unique process to be carried out to achieve continuous operation of a fuel cell. When one bed is being regenerated, the other remains fully operational thus allowing for continuous operation of the entire fuel cell power plant. In that connection, the step of initiation of regeneration may be executed when the carbon monoxide sensors 166A and/or 166B reach a predetermined concentration. Further, regeneration may occur when a given temperature sensor 168A and/or 168B reach a predetermined level. Further, with the assistance Of $O_2$ sensors 180a and 180b, which are provided in-line with outlet gas conduits 158a and 158b, the levels of oxygen present at the outputs of beds 120a and 120b can be monitored and employed as indicators of a need to regenerate the beds 120a and 120b. The levels of oxygen in gas conduit 158a and 158b are indicative of the effectiveness of beds 120a and 120b. As beds 120a and 120b become more and more poisoned over time, more oxygen will be present in respective conduits 158a and 158b because less oxygen-consuming reactions are taking place. In accordance with this alternative process, control device 170 is specifically programmed to ensure that regeneration of selective oxidizers 120A and 120B does not occur at the same time. As a result, continuous, uninterrupted operation of the power plant is achieved. In view of the foregoing, the process employing two selective oxidizers in parallel is well-suited for stationery power plant applications, such as hospitals and large office buildings.

It would be appreciated by those skilled in the art that various changes and modifications can be made to the illustrated embodiments without departing from the spirit of the present invention. All such modifications and changes are intended to be covered by the appended claims.

What is claimed is:

1. A process for regenerating a selective oxidizer bed at operation start-up, comprising the steps of:

providing a fuel processor system for supplying fuel;

providing a selective oxidizer bed with no fuel being supplied thereto from said fuel processing system;

heating said selective oxidizer bed to approximately 180° F.;

passing oxygen containing gas through said selective oxidizer bed while maintaining said selective oxidizer bed at a temperature of approximately 180° F. for 1–2 minutes;

purging said selective oxidizer bed with inert gas to remove residual oxygen therefrom; and introducing a hydrogen rich stream from said fuel processor system into said selective oxidizer bed.

2. The process for regenerating a selective oxidizer bed of claim 1, wherein said oxygen containing gas is air.

3. The process for regenerating a selective oxidizer bed of claim 1, further comprising the step of:

embedding cooling conduits within said selective oxidizer bed; and introducing coolant through said cooling conduits.

4. The process of claim 3, further comprising the step of maintaining said selective oxidizer bed at a temperature of approximately 180° F. by selectively controlling the temperature and flow rate of coolant through said cooling conduits.

5. A process for regenerating a selective oxidizer bed at operating shut-down, comprising the steps of:

providing a fuel processor system for providing fuel;

providing a selective oxidizer bed with no fuel being supplied thereto from said fuel processor system;

providing a fuel cell having an anode connected to the fuel processing system;

purging said selective oxidizer bed and said anode of said fuel cell with inert gas to remove residual fuel therefrom;

passing an oxygen containing gas through said selective oxidizer bed while maintaining said selective oxidizer bed at a temperature of approximately 180° F. for 1–2 minutes;

allowing said selective oxidizer bed to cool to ambient temperature;

heating said selective oxidizer bed to approximately 180° F.;

purging said selective oxidizer bed with inert gas to remove residual air therefrom; and introducing fuel into said selective oxidizer bed.

6. The process for regenerating a selective oxidizer bed of claim 5, wherein said oxygen containing gas is air.

7. The process for regenerating a selective oxidizer bed of claim 5, further comprising the step of:

embedding cooling conduits within said selective oxidizer bed; and introducing coolant through said cooling conduits.

8. The process of claim 7, further comprising the step of maintaining said selective oxidizer bed at a temperature of approximately 180° F. by selectively controlling the temperature and flow rate of coolant through said cooling conduits.

* * * * *